Oct. 13, 1931.  G. MUFFLY  1,827,097
REFRIGERATING APPARATUS
Filed Feb. 14, 1930
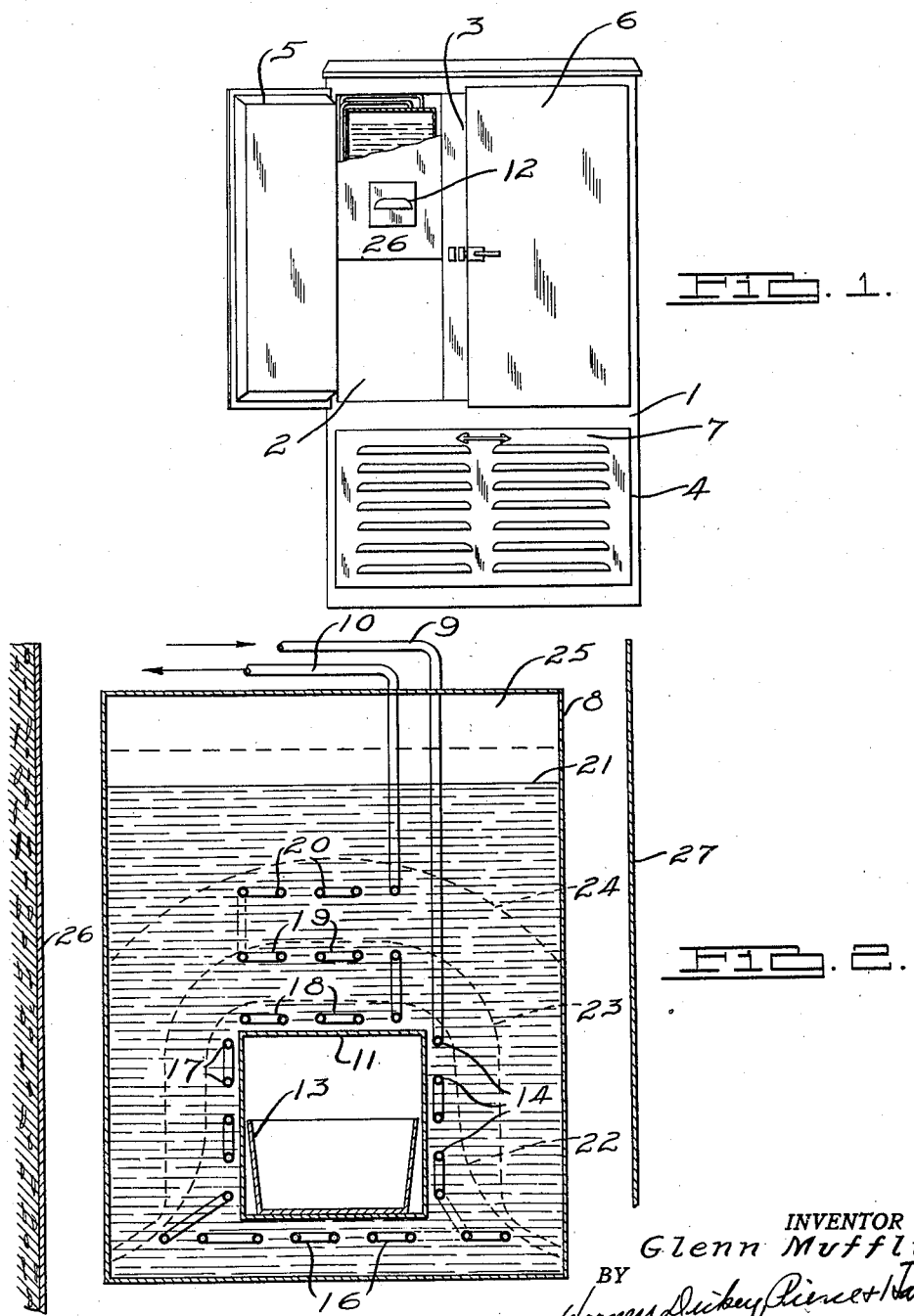
INVENTOR
Glenn Muffly.
BY
Harness, Dickey, Pierce & Hann
ATTORNEYS.

Patented Oct. 13, 1931

1,827,097

UNITED STATES PATENT OFFICE

GLENN MUFFLY, OF RICHMOND, MICHIGAN, ASSIGNOR TO COPELAND PRODUCTS, INC., OF DETROIT, MICHIGAN, A CORPORATION OF MICHIGAN

REFRIGERATING APPARATUS

Application filed February 14, 1930. Serial No. 428,264.

This invention relates to refrigerating apparatus, and particularly to that type thereof known as mechanical refrigerators employing the expansion of a refrigerant for heat absorption.

The main objects of this invention are to provide an improved refrigerating unit; to provide a device of this kind in which eutectic solutions or mixtures may be used as brine; to provide a freezing unit in which brine that has a latent heat of fusion and which expands upon freezing may be converted from a liquid to a solid state; to provide an improved arrangement of refrigerant conductors in a brine tank for initially freezing brine at a selected portion of the tank; to provide means for initially converting the liquid brine at the lower and central part of the tank to a solid state and which will progressively solidify the brine of the remaining parts of the tank in the order of their proximity to the initially frozen region so as to prevent bulging of the tank; and to provide an accessible freezing compartment substantially at the center of the region of the tank in which the brine first freezes.

An illustrative embodiment of my invention is shown in the accompanying drawings, in which Fig. 1 is a front elevation of a cabinet type refrigerator embodying my invention.

Fig. 2 is a central vertical section of an improved brine tank and refrigerant circulating system.

It is to be noted that throughout the specification and the appended claims by the term "brine" is meant any liquid which, having been cooled by a refrigerating system, is used for the absorption of heat, this being the generally accepted definition of this term in the refrigeration art.

Heretofore, in refrigerating units of this kind brines that expand upon freezing could not be solidified without bulging or otherwise injuring the brine tank. As a result of this difficulty it has been impossible to extract the maximum amount of heat from a brine solution.

In the present invention the expansion tubes of the refrigerant circulating system are arranged so as to initially freeze the brine in the lower and lower central portions of the tank and to progressively freeze the brine in the remaining parts of the tank in the order of their proximity to the initially frozen portions.

In the form shown the cabinet 1 has an upper compartment 2 provided with doors 5 and 6 and a lower compartment 4 provided with a door 7. Mounted in the upper compartment 2 is a brine tank 8 into which a refrigerant inlet 9 and a refrigerant outlet pipe 10 extend.

A freezing container 11 is provided at the lower central portion of the tank 8 and has an accessible opening which is normally closed by the door 12 carried by the tray 13. The interior of the container 11 is sealed from the interior of the tank 8 so as to prevent the admission of brine thereinto. The tray 13 or other receptacle is located in the freezing chamber 11 for retaining articles to be frozen or cooled at the region of the brine tank which is maintained at the lowest temperature.

The lower end of the refrigerant inlet pipe 9 communicates with a series of vertically adjacent expansion tubes 14 which are located adjacent the right side wall of the container as shown in Fig. 2. The series of tubes 14 is connected with a series of horizontally adjacent expansion tubes 16 which are disposed below the freezing container 11. This latter series of tubes is located slightly above the bottom of the container 8 and its extremities are within close proximity of the sides of the tank 8. The tubes 16 discharge into vertically arranged expansion tubes 17 which extend along the left side of the container 11 and communicate with a series of horizontally adjacent expansion tubes 18 located directly above the top wall of the container 11. Arranged directly above the tubes 18 are series of tubes 19 and 20, respectively. The tubes 18, 19 and 20 are in the central intermediate and upper portions of the tank 8 and they communicate with the refrigerant outlet pipe 10.

In operation, the brine tank 8 is filled with a suitable brine solution, adapted to freeze during normal operation of the apparatus, to a level indicated at 21. A brine which has a high latent heat of fusion and which expands upon freezing may be used in this apparatus. The incoming refrigerant is conducted directly to the vertically adjacent series of expansion tubes 14 and from there into the horizontally adjacent tubes 16. The refrigerant rises through the vertically adjacent expansion tube 17 and passes into the horizontally adjacent tube 18. From the latter tube the refrigerant circulates through the layers of tubes 19 and 20 and is returned to the refrigerant outlet pipe 10. These series of tubes constitute a coil which has its portions of highest heat absorbing capacity located at the lower and lower central portions of the tank.

The incoming refrigerant extracts heat from the brine in the lower portion of the tank and the brine which is adjacent the walls of the container 11, causing ice to be formed in the shape illustrated by dotted lines 22. Continued circulation of the refrigerant causes the nucleus represented at 22 to grow to the form shown at 23 and subsequently to the form shown at 24. Further circulation of the refrigerant progressively freezes the brine in the reverse order of its proximity to the top of the tank 8 in which an expansion space 25 is provided. In this manner bulging of the sides of the tank is avoided and expansion of the brine is directed upwardly towards the expansion space 25.

Baffles 26 and 27 may be located as shown in spaced relation to the front and sides of the tank 8 for directing the current of air in a manner which is conventional in refrigerating cabinets of this kind.

With the above refrigerant circulating system brines which freeze at a low temperature, such as eutectic solutions, and which expand upon freezing may be used without damaging the tank.

Although but one specific embodiment of my invention is shown and described, it will be understood that various changes in the size and shape and arrangement of parts may be made without departing from the spirit and scope of my invention, and it is not intended to limit the scope of my invention other than by the terms of the appended claims.

I claim:—

1. In a refrigerating apparatus, a tank, brine in said tank adapted to be frozen during normal operation of said apparatus, a refrigerant inlet in said tank, a series of vertically adjacent expansion tubes in said tank communicating directly with said inlet and located at the lower central portion thereof, a series of horizontally adjacent expansion tubes communicating with said first mentioned tubes and located at the lower end portion of said tank, a second series of vertically adjacent expansion tubes communicating with said horizontally adjacent tubes, said series of tubes being adapted to initially solidify the brine of the lower central portion of said tank, and a refrigerant outlet communicating with the second mentioned vertically arranged series of tubes.

2. In refrigerating apparatus, a tank having brine therein adapted to be frozen during normal operation of said apparatus and an expansion space above said brine, a refrigerant circulating system comprising vertically spaced expansion tubes having an inlet communicating with the lowermost tubes and an outlet communicating with the uppermost tubes, a preponderance of said tubes being arranged adjacent the bottom of said tank.

3. In refrigerating apparatus, a tank, brine in said tank adapted to be frozen during normal operation of said apparatus and comprising an eutectic mixture which expands upon freezing, and a refrigerant circulating system comprising an inlet, an outlet and an expansion coil, the tubes of said coil at the inlet end thereof being located at the lower central portions of said tank, and a preponderance of said tubes being located in the lower part of said tank.

4. A refrigerator comprising a cabinet having adjacent compartments therein, a tank in one of said compartments, brine in said tank adapted to be frozen during normal operation of said apparatus and an expansion coil having a refrigerant inlet and outlet and comprising superimposed series of convolutions located substantially in the lower central portion of said tank, the upper and lower series of convolutions being in communication with said outlet and said inlet respectively.

GLENN MUFFLY.